2,822,363

PREPARATION OF CYANURIC ACID FROM UREA

Ludwig J. Christmann, Bronxville, N. Y., and Daniel E. Nagy, Stamford, Conn., assignors to American Cyanamid Company, New York, N. Y., a corporation of Maine No Drawing. Application October 31, 1955
Serial No. 544,004

8 Claims. (Cl. 260—248)

This invention relates to the preparation of cyanuric acid. More particularly, it pertains to the polymerization of urea and/or biuret to cyanuric acid in the liquid phase.

Cyanuric acid may be represented by the empirical formula: $(CHON)_3$. It finds utility as an intermediate in the preparation of trichlorocyanuric acid by the direct chlorination of cyanuric acid in an alkaline medium. Resultant chlorinated product is the active component of dry bleach compositions.

Cyanuric acid has been previously prepared in the liquid phase by hydrolyzing triazines such as ammelide, ammeline, and cyanuric chloride. This process is not wholly satisfactory because such triazines are relatively expensive. Another method comprises the fusion of urea in the presence of a metal or ammonium salt. This process presents a serious shortcoming because the product so-made hardens or sets-up in the reactor in which fusion occurs. This effect renders the product difficult to recover and utilize efficiently.

It is an object of the present invention to provide a simple and inexpensive process for preparing cyanuric acid from urea and/or biuret in the liquid phase. It is a further object of the invention to prepare cyanuric acid in good yield and purity in the presence of an inert phenolic solvent. It is a still further object of the invention to present a process in which cyanuric acid prepared from urea and/or biuret can be expeditiously recovered.

To this end, a carbonyl compound such as urea and/or biuret is heated in an inert phenolic solvent for the carbonyl compound at a temperature of at least 175° C. or above. Advantageously, temperatures up to the boiling point of the phenolic solvent can be employed. However, temperatures above the boiling point of the solvent can be used when corresponding superatmospheric pressures are employed. Such is not a preferred practice because the use of pressure requires special equipment which increases the operational cost of the process. Heating of the mixture is continued until ammonia vapors are no longer detected. Cyanuric acid precipitates out of solution in crystalline form and thereafter is recovered expeditiously in good yield and purity.

Although a large number of high boiling solvents is known, it is surprising to find that the use of a phenolic solvent is advantageous in preparing and recovering cyanuric acid from urea and/or biuret in good yield and purity.

Illustrative phenolic solvents include phenol, monoalkyl substituted phenols such as cresol, polyalkyl substituted phenols such as xylenol, and mixtures thereof as, for example, a 50-50 mixture of o-cresol and p-cresol and cresylic acid. The preferred phenolic solvent is any commercial grade of cresylic acid. This is advantageous because the solvent is readily available. However, any of the latter-mentioned phenolic solvents may be used in the process of the invention.

The ratio of phenolic compound to urea or biuret is not critical and may vary over a wide range. However, it is advantageous to employ a 1:1 weight ratio of urea or biuret to phenolic solvent, although ratios from between about one-half (0.5) part of urea or biuret per part of solvent and about five (5) parts of urea per part of solvent can be used, the parts being by weight.

Depending upon the particular temperature employed in converting urea to cyanuric acid, a total reaction time of from one to ten hours may be required. For example, where temperatures in the upper range are employed (that is, at about the boiling point of phenolic solvent), a short reaction time is required. Usually for 1 to 4 hours is sufficient. Conversely, the lower the temperature of reaction, the longer the time of reaction.

Resultant cyanuric acid may be selectively washed in an aromatic hydrocarbon solvent, such as benzene or toluene, to remove any residual phenolic solvent. The phenolic solvent is soluble in the aromatic hydrocarbon solvent, but cyanuric acid is insoluble in such hydrocarbon solvent. Hence, the phenolic solvent can be readily removed from cyanuric acid. In another method, cyanuric acid can be purified by steam distilling cyanuric acid containing residual phenolic solvent and thereafter drying the thus-purified cyanuric acid.

The following examples illustrate without limiting the invention. Unless otherwise noted, the parts are by weight.

Example 1

180 parts of urea are added to 200 parts of a commercial grade of cresylic acid in which a maximum of 2% boils below 190° C. The mixture is thoroughly stirred in a reactor fitted with a reflux condenser. The reactor, heated to a temperature of about 205° C., is held at that temperature until the evolution of ammonia is no longer detected. After three and one-half hours, heating is discontinued. Resultant cyanuric acid is precipitated, separated by filtration, and thereafter is washed with benzene and dried. 118 parts of cyanuric acid are recovered, accounting for a yield of 95.1% of theory.

When o-cresol, p-cresol, m-cresol, or xylenol are substituted for the cresylic acid in the above example, similar high yields of cyanuric acid are obtained.

Example 2

In this run, a reactor similar to that of Example 1 is employed. About 2,000 parts of urea are added to about 2,000 parts of a commercial grade of cresylic acid, in which a maximum of 2% boils below 190° C. The mixture is heated gradually to 207° C. and held at that temperature for 4 hours until evolved ammonia is no longer detected. The contents are then emptied from the reactor and filtered. Resultant cyanuric acid cake is treated to remove any residual cresylic acid by washing the cake with toluene. 1337 parts of cyanuric acid are recovered, amounting to a yield of 93.3% of theory.

Example 3

Into a reactor outfitted with a reflux condenser as in Example 1, a mixture approximating 180 parts of biuret and 200 parts of p-cresol is introduced. The mixture is gently heated to reflux temperature and maintained at the reflux temperature level until ammonia odor is no longer detected. In approximately three hours heating is discontinued to permit resultant solid cyanuric acid to be recovered. The latter is separated from the phenolic solvent by filtration, washed with benzene and dried. Cyanuric acid obtained represents a yield of about 92% of theory.

Example 4

Into a reactor which is outfitted with a reflux condenser are added 180 parts of urea and 180 parts of phenol. The contents are thoroughly stirred and heated to a temperature of about 180° C. The reaction is then held at that temperature until the evolution of ammonia can no longer be detected. After 10 hours, heating is discontinued. Precipitated cyanuric acid is obtained by filtering the contents from in the reactor. Resultant cyanuric acid is recovered, accounting for a yield of approximately 95% of theory.

*Example 5*

Following the procedure as set forth in Example 4 above, 180 parts of urea and 180 parts of xylenol are introduced into a reactor outfitted with a reflux condenser. The contents in the reactor are stirred and heated for about three hours at 215° C. Ammonia could no longer be detected, thus indicating completion of the reaction. The contents are then cooled, filtered and the resultant crystalline cake is washed with benzene. After drying, resultant cyanuric acid, weighing 118.5 parts, is recovered.

While good yields are obtained by the process of the present invention, it is possible to obtain more nearly quantitative yields by recovering additional cyanuric acid from the phenolic solvent mother liquor after several repeated washings with an aromatic hydrocarbon solvent. This practice is desirable in view of the fact that cyanuric acid is at present an expensive compound of commerce. Also, additional cyanuric acid can be recovered by reusing any excess phenolic solvent mother liquor in subsequent runs for converting either urea or biuret to cyanuric acid.

We claim:

1. A method for the preparation of cyanuric acid comprising: heating a compound selected from the group consisting of urea and biuret to a temperature of at least 175° C. in a liquid medium consisting of an inert phenolic solvent, said solvent being selected from the group consisting of phenol, cresol, cresylic acid, xylenol and isomers thereof, continuing heating the mixture at a temperature between 175° C. and the boiling point of said solvent until ammonia substantially ceases to evolve, and recovering cyanuric acid as a crystalline precipitate from said phenolic solvent.

2. A method according to claim 1 wherein the crystalline precipitated cyanuric acid is washed with a hydrocarbon aromatic solvent, separating the acid from said hydrocarbon solvent and thence recovering crystalline cyanuric acid.

3. A process according to claim 1 in which the recovered cyanuric acid is steam distilled.

4. A process according to claim 1 in which the phenolic solvent is phenol.

5. A process according to claim 1 in which the phenolic solvent is a cresol.

6. A process according to claim 1 in which the phenolic solvent is a mixture of cresols.

7. A process according to claim 6 in which the mixture of cresols is cresylic acid.

8. A process according to claim 1 in which the phenolic solvent is xylenol.

References Cited in the file of this patent

UNITED STATES PATENTS 2,299,274   Hill _____ Oct. 20, 1942

FOREIGN PATENTS 506,070   Canada _____ Sept. 28, 1954

OTHER REFERENCES

Hoffman: Berichte Deutsche Chemische Gesellschaft, vol. 4, page 267 (1871).

Baeyer: Annalen der Chemie und Pharmacie, vol. 131, page 252 (1864).

The Condensed Chemical Dictionary, 3d ed., Reinhold Pub. Corp. (1942), page 213.